(12) United States Patent
Cheng et al.

(10) Patent No.: US 8,267,362 B2
(45) Date of Patent: Sep. 18, 2012

(54) MOUNTING BRACKET MECHANISM FOR FIXING A MONITOR

(75) Inventors: Sheng-Hsiung Cheng, Taipei Hsien (TW); Chin-Hsiung Chen, Taipei Hsien (TW); Shuang-Ji Jiang, Taipei Hsien (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 259 days.

(21) Appl. No.: 12/611,124

(22) Filed: Nov. 3, 2009

(65) Prior Publication Data
US 2010/0123052 A1      May 20, 2010

(30) Foreign Application Priority Data
Nov. 17, 2008   (TW) ................................ 97220565 U

(51) Int. Cl.
*F16M 11/00*      (2006.01)

(52) U.S. Cl. ................ 248/201; 248/224.8; 248/225.11; 248/297.31; 248/917; 211/103; 348/E5.128; 361/825; 52/646

(58) Field of Classification Search .............. 248/121, 248/466, 475.1, 476, 477, 201, 224.8, 225.11, 248/297.31, 917, 919; 348/E5.128; 211/103, 211/106, 191, 182, 189; 52/646; 361/825
See application file for complete search history.

(56) References Cited

U.S. PATENT DOCUMENTS

| | | | | |
|---|---|---|---|---|
| 5,509,541 | A * | 4/1996 | Merl .............................. | 211/103 |
| 7,316,379 | B1 * | 1/2008 | Graham ...................... | 248/298.1 |
| 7,537,189 | B2 * | 5/2009 | Jung et al. .................. | 248/298.1 |
| 7,878,473 | B1 * | 2/2011 | Oh ................................. | 248/339 |
| 7,963,489 | B2 * | 6/2011 | O'Keene et al. .............. | 248/201 |
| 2007/0023593 | A1 * | 2/2007 | Fedewa ........................ | 248/201 |
| 2008/0035813 | A1 * | 2/2008 | O'Keene et al. ......... | 248/225.21 |

* cited by examiner

*Primary Examiner* — Anita M King
(74) *Attorney, Agent, or Firm* — Winston Hsu; Scott Margo

(57) ABSTRACT

A mounting bracket mechanism includes a first stand, at least one beam locked on the first stand, at least one second stand disposed on a side of the first stand and locked on an end of the beam in an adjustable manner relative to the beam, and least one hanger for connecting a monitor and hanging the monitor on the beam so as to fix the monitor.

15 Claims, 9 Drawing Sheets

MOUNTING BRACKET MECHANISM FOR FIXING A MONITOR

BACKGROUND OF THE INVENTION

1. Field of the Invention

The present invention relates to a mounting bracket mechanism, and more particularly, to a mounting bracket mechanism for fixing a monitor so as to be suitable for a video-wall structure.

2. Description of the Prior Art

In an advanced technology, cathode ray tube (CRT) displays are replaced completely and flat-panel displays (FPD) are main products in a display market. In contrast to huge volume of the conventional cathode ray tube displays, the flat-panel displays have advantages of low power consumption, low radiation, and miniaturized volume. At this time, expansion of dimensions of the flat-panel displays popularizes the miniaturized flat-panel displays in the display market, such as in a domestic display, in an outdoor advertisement, and in an exhibition. A video-wall structure is applied for an enormous frame of an outdoor displaying. While setting the video-wall structure, all displays are located accurately and are arranged closely by professional measurements and orientation so that it is inconvenient for users, such as businessmen, to install by themselves. In addition, because hanging means for hanging each display are separate components, the hanging means of the different displays can not be integrated easily so that the whole video-wall structure is complicated. Thus, design of a simple mounting bracket mechanism for the video-wall structure is an important issue nowadays.

SUMMARY OF THE INVENTION

According to the claimed invention, a mounting bracket mechanism includes a first stand, at least one beam locked on the first stand, at least one second stand disposed on a side of the first stand and locked on an end of the beam in an adjustable manner relative to the beam, and at least one hanger for connecting a monitor and hanging the monitor on the beam so as to fix the monitor.

According to the claimed invention, the mounting bracket mechanism includes two beams locked on the first stand and the second stand perpendicularly and being parallel to each other substantially.

According to the claimed invention, a slot is formed on the beam and the second stand is locked on the slot of the beam.

According to the claimed invention, a plurality of graduations is formed on the beam and is located on a side of the slot for locating a relative position between the second stand and the beam.

According to the claimed invention, the mounting bracket mechanism includes two second stands disposed on two sides of the first stand respectively and being parallel to each other substantially.

According to the claimed invention, the mounting bracket mechanism includes two hangers hung on the beam perpendicularly and being parallel to each other substantially.

According to the claimed invention, the mounting bracket mechanism further includes a connecting component for connecting the adjacent second stands laterally by locking two ends of the connecting component on surfaces of the adjacent second stands respectively.

According to the claimed invention, the mounting bracket mechanism further includes a connecting component for connecting the adjacent first stands or the adjacent second stands vertically by sheathing two ends of the connecting component inside the adjacent first stands or the adjacent second stands respectively.

According to the claimed invention, a plurality of graduations is formed on the connecting component for locating relative positions between the adjacent first stands or the adjacent second stands.

According to the claimed invention, a mounting bracket mechanism includes at least one first stand, at least one beam locked on the first stand, a plurality of second stands locked on an end of the beam respectively, at least one connecting component for connecting the adjacent first stands or the adjacent second stands, and at least one hanger for connecting a monitor and hanging the monitor on the beam so as to fix the monitor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
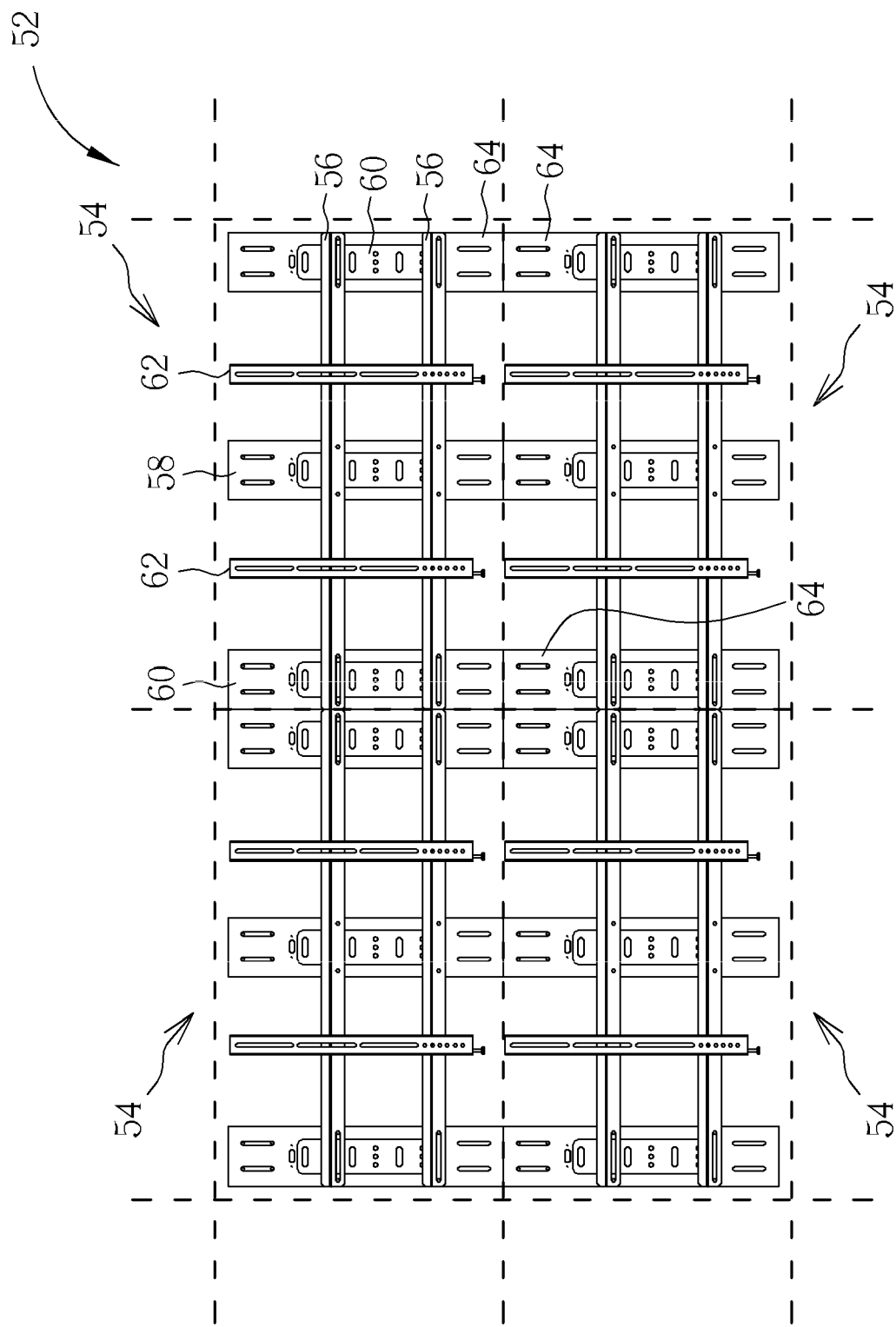
FIG. 1 is a diagram of a mounting bracket mechanism for fixing at least one display of the present invention.
Figure 2:
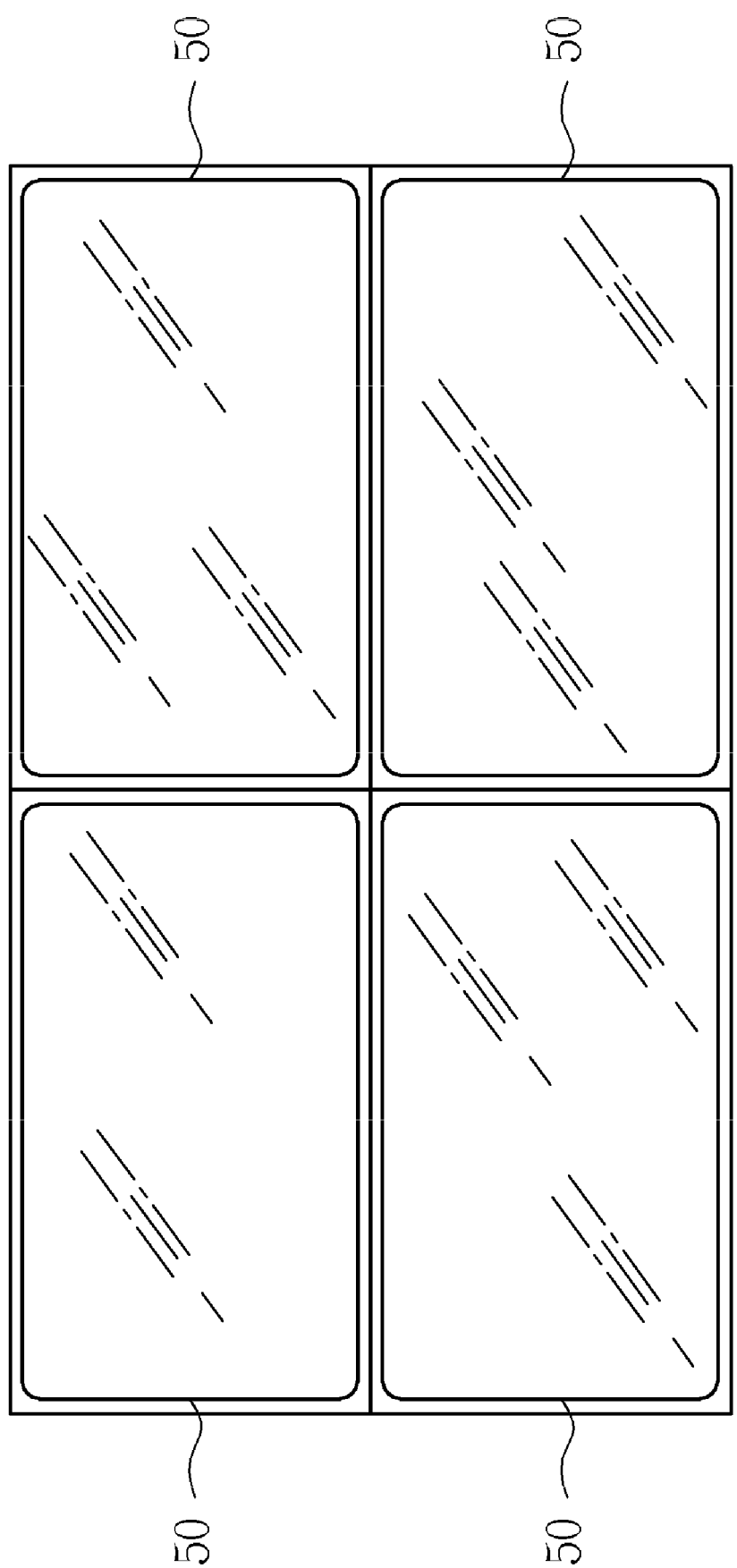
FIG. 2 is a diagram of a video-wall structure with a plurality of displays of the present invention.

Please refer to FIG. 1 and FIG. 2. FIG. 1 is a diagram of a mounting bracket mechanism 52 for fixing at least one display 50 of the present invention. FIG. 2 is a diagram of a video-wall structure with a plurality of displays 50 of the present invention. The mounting bracket mechanism 52 includes a plurality of mounting bracket modules 54. As shown in FIG. 1, the mounting bracket mechanism 52 includes four (2×2 array) mounting bracket modules 54. Each mounting bracket module 54 includes two beams 56, a first stand 58, two second stands 60, and two hangers 62. The mounting bracket mechanism 52 further includes at least one connecting component 64 for connecting the different mounting bracket modules 54. The two beams 56 can be disposed in parallel substantially and are locked on the first stand 58 respectively. The two second stands 60 can be disposed on two sides of the first stand 58 respectively and are parallel to each other substantially. Each second stand 60 is locked on an end of the two beams 56 respectively and can be connected to the two beams 56 in an adjustable manner. The two beams 56 can be perpendicular to the first stand 58 and the two second stands 60 substantially. The two hangers 62 can be hung on the two beams 56 and are parallel to each other substantially, and the two hangers 62 can be perpendicular to the two beams 56 substantially. The hangers 62 are used for connecting the corresponding displays 50 respectively so as to fix the displays 50. Each connecting component 64 is used for connecting the adjacent second stands 60 of the different mounting bracket modules 54 so as to connect the different mounting bracket modules 54. The mounting bracket mechanism 52 can be formed as an array of supporting structures via the connecting components 64 to connect the different mounting bracket modules 54. Therefore, the mounting bracket mechanism 52 can support the plurality of displays 50 so as to form a video-wall structure. In addition, amounts and relative positions of the mounting bracket modules 54 and the corresponding displays 50, amounts and relative positions of the beams 56, the first stand 58, the second stand 60, and the hangers 62 of each mounting bracket module 54, and an amount and relative position of the connecting components 64 for connecting the different mounting bracket modules 54 are not limited to the above-mentioned embodiment and depend on actual demand.

Figure 3:
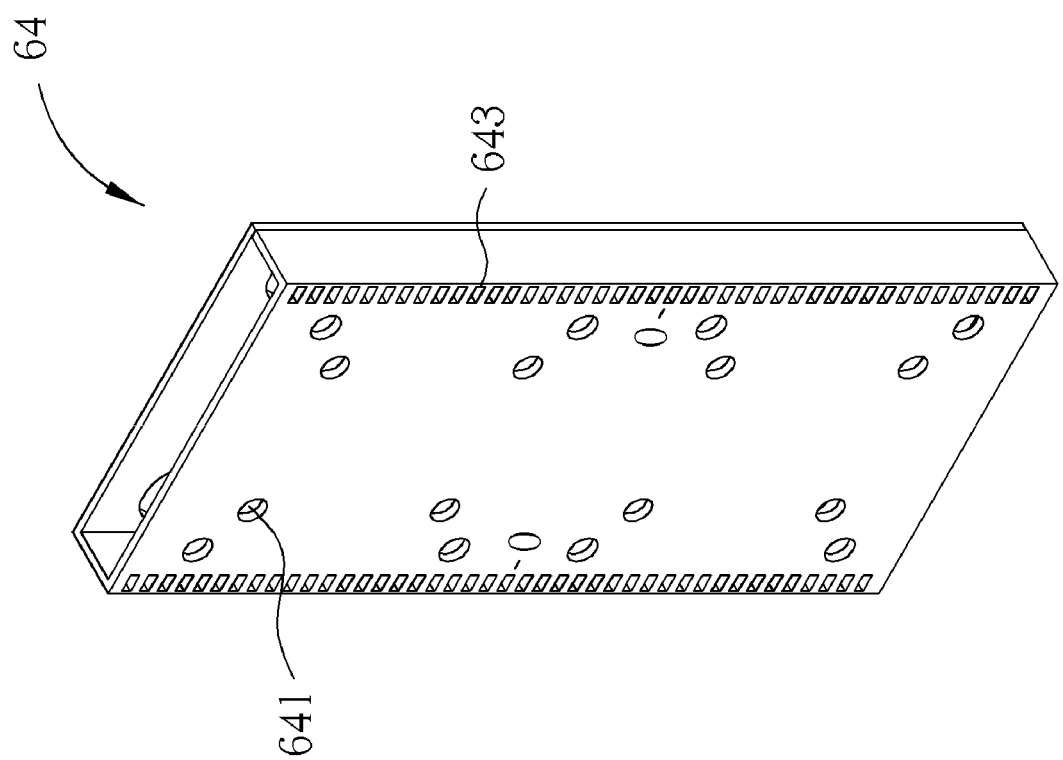
FIG. 3 and FIG. 4 are diagrams of a connecting component at different view angles of the present invention.
Figure 4:
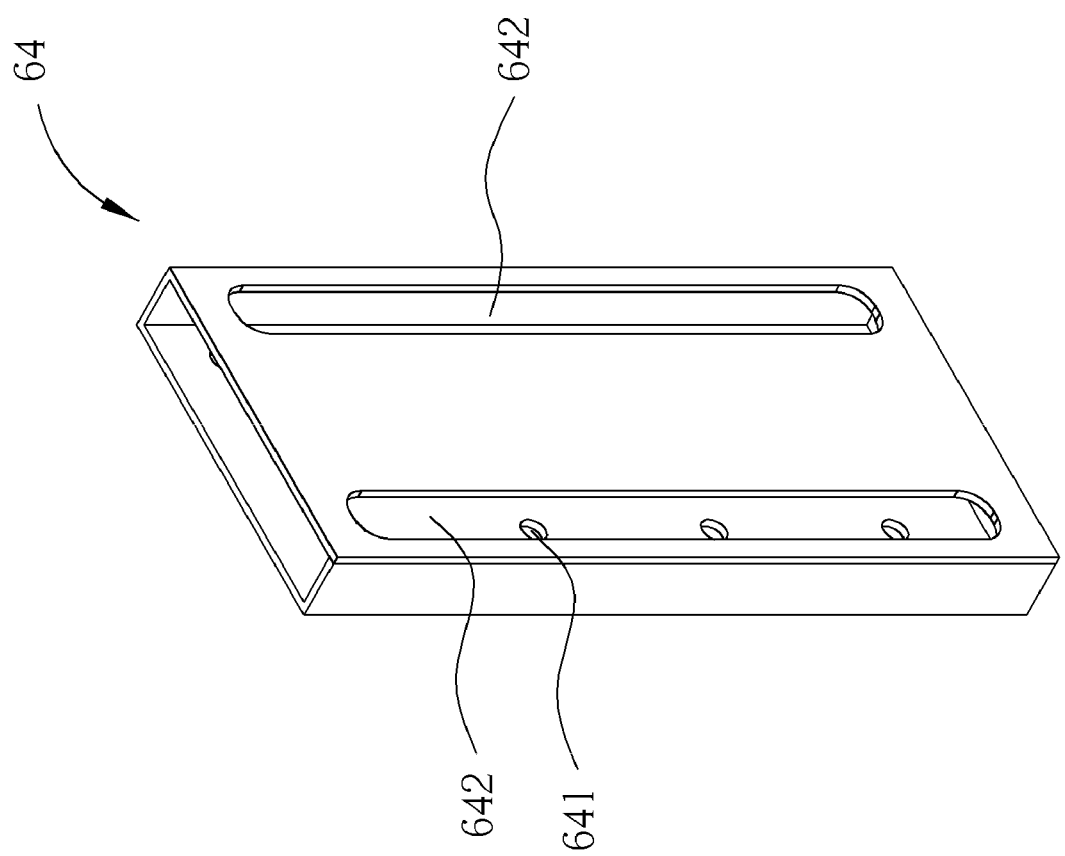
Figure 5:
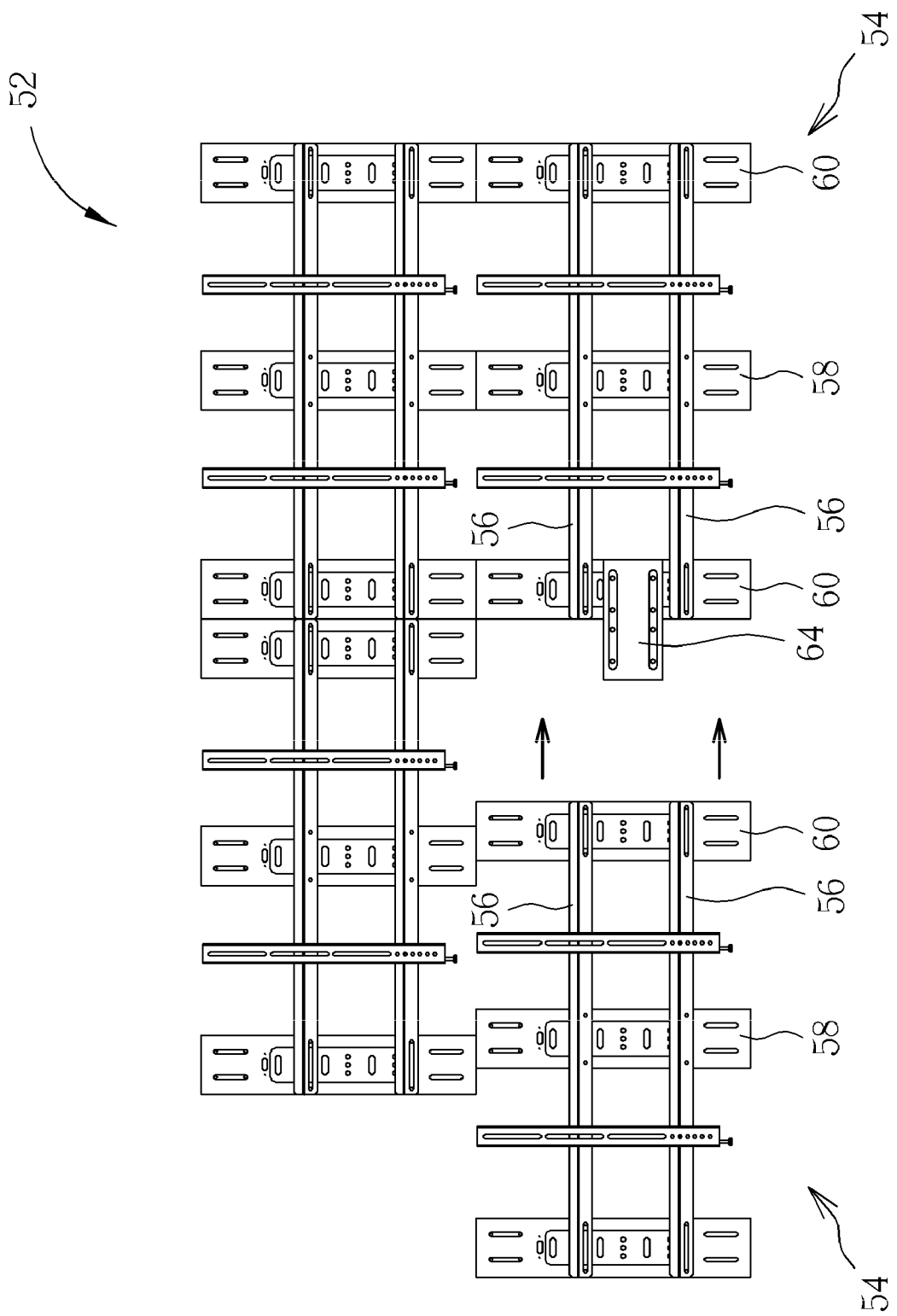
FIG. 5 is a diagram of the connecting component for connecting adjacent second stands of different mounting bracket modules laterally of the present invention.
Figure 6:
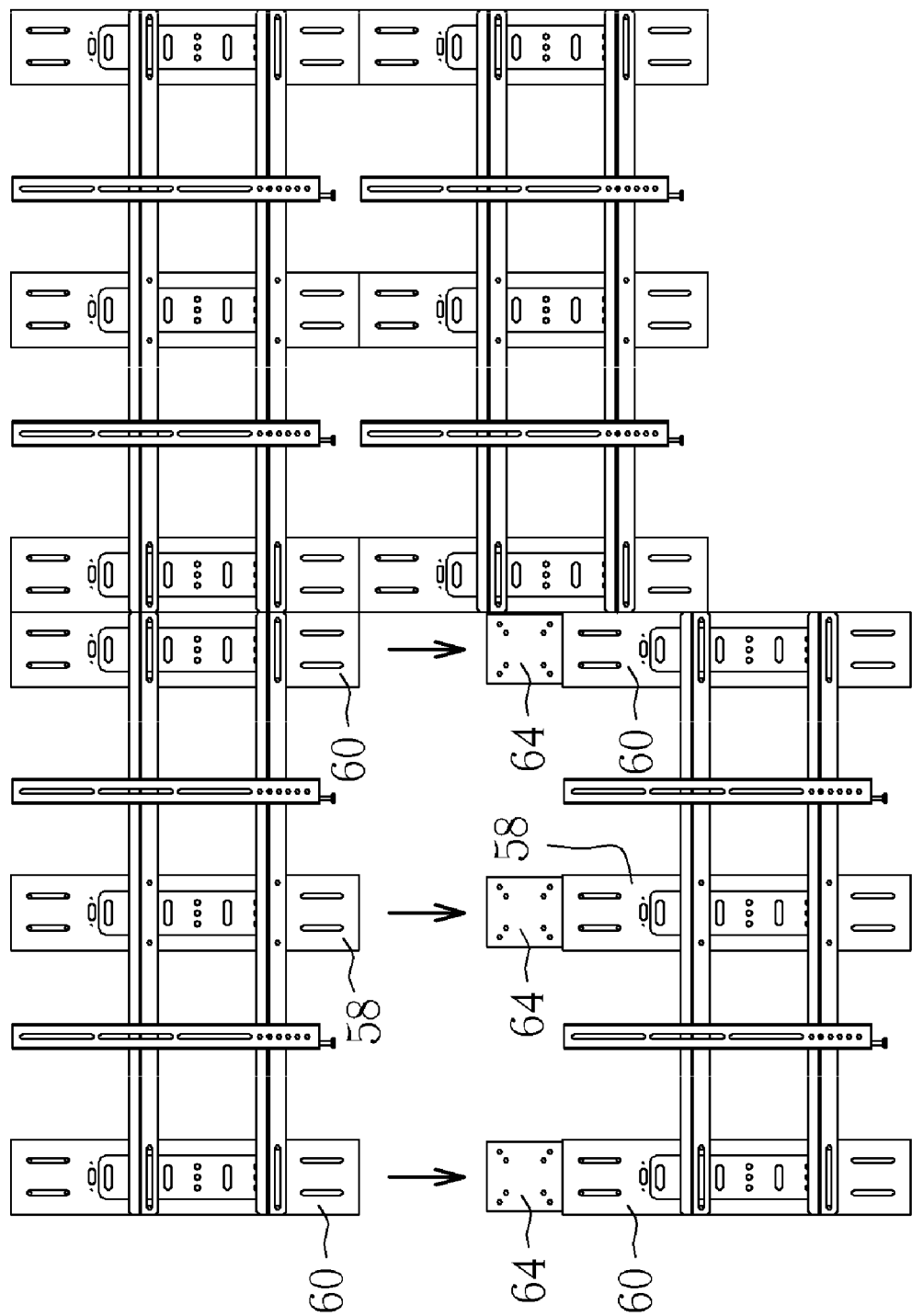
FIG. 6 is a diagram of the connecting component for connecting adjacent first stands and the adjacent second stands of the different mounting bracket modules vertically of the present invention.

Please refer to FIG. 3 to FIG. 6. FIG. 3 and FIG. 4 are diagrams of the connecting component 64 at different view angles of the present invention. FIG. 5 is a diagram of the connecting component 64 for connecting the adjacent second stands 60 of the different mounting bracket modules 54 laterally of the present invention. FIG. 6 is a diagram of the connecting component 64 for connecting the adjacent first stands 58 and the adjacent second stands 60 of the different mounting bracket modules 54 vertically of the present invention. A plurality of holes 641 and two slots 642 are formed on the connecting component 64. While the different mounting bracket modules 54 are connected laterally, as shown in FIG. 4 and FIG. 5, two ends of the connecting component 64 can be locked on surfaces of the adjacent second stands 60 of the different mounting bracket modules 54 respectively. For example, a locking device, such as a screw, can be utilized to pass through the holes 641 formed nearby two sides of the connecting component 64 and the two slots 642 so as to lock the adjacent second stands 60 of the different mounting bracket modules 54 on the two ends of the connecting component 64. Accordingly, screw threads can be formed on the two second stands 60. Design of the holes 641 and the slots 642 are not limited to the above-mentioned embodiment. For example, the two slots 642 can be replaced by a hollow portion formed on a back side of the connecting component 64. In addition, a structure composed of the adjacent second stands 60 and the connecting component 64 can be locked on a loading plane, such as a wall. Therefore, the mounting bracket module 54 can be assembled laterally so as to form a lateral video-wall structure. The amount and position of the connecting component 64 capable of connecting the different mounting bracket modules 54 laterally are not limited on the above-mentioned embodiment and depend on actual demand.

While the different mounting bracket modules 54 are connected vertically, as shown in FIG. 6, the two ends of the connecting component 64 can be sheathed inside the adjacent first stands 58 and the adjacent second stands 60 of the different mounting bracket modules 54 respectively. Then, the locking device, such as a screw, can be utilized to pass through holes of the adjacent first stands 58, holes of the adjacent second stands 60, and the holes 641 formed nearby an internal side of the connecting component 64 so that the two ends of the connecting component 64 can be locked on the adjacent first stands 58 and the adjacent second stands 60 of the different mounting bracket modules 54 respectively. Accordingly, the screw threads can be formed on the connecting component 64. Design of the holes 641 is not limited on the above-mentioned embodiment. In addition, a structure composed of the first stand 58, the second stand 60, and the connecting component 64 can be locked on the loading plane, such as the wall. Therefore, the mounting bracket module 54 can be assembled vertically so as to form a vertical video-wall structure. The amount and position of the connecting component 64 capable of connecting the different mounting bracket modules 54 vertically are not limited to the above-mentioned embodiment. For example, the connecting component 64 can be used for connecting the adjacent first stands 58 of the different mounting bracket modules 54 or for connecting the adjacent second stands 60 of the different mounting bracket modules 54, selectively. The connecting components 64 used for extending vertically and for extending laterally can be the same structure for simplicity.

In conclusion, a sequence of assembling the mounting bracket mechanism 52 is as follows. The first stand 58 can be locked on the loading plane at first, such as the wall. Then, the two beams 56 can be locked on the first stand 58 respectively, and the two second stands 60 can be locked on the two ends of the two beams 56 respectively. The two second stands 60 can be connected to the two beams 56 in the adjustable manner, respectively. While the mounting bracket mechanism 52 needs to be extended laterally, the two ends of the connecting component 64 can be installed on the surfaces of the adjacent second stands 60 of the different mounting bracket modules 54 respectively so as to lock the connecting component 64 on the adjacent second stands 60 of the different mounting bracket modules 54 laterally. While the mounting bracket mechanism 52 needs to be extended vertically, the two ends of the connecting component 64 can be sheathed inside the adjacent first stands 58 or the adjacent second stands 60 of the different mounting bracket modules 54 respectively so as to lock the connecting component 64 on the adjacent first stands 58 or the adjacent second stands 60 of the different mounting bracket modules 54 vertically. Finally, the hangers 62 of the display 50 can be hung on the beams 56 so as to fix the display 50 for completing assembly of the video-wall structure.

Figure 7:
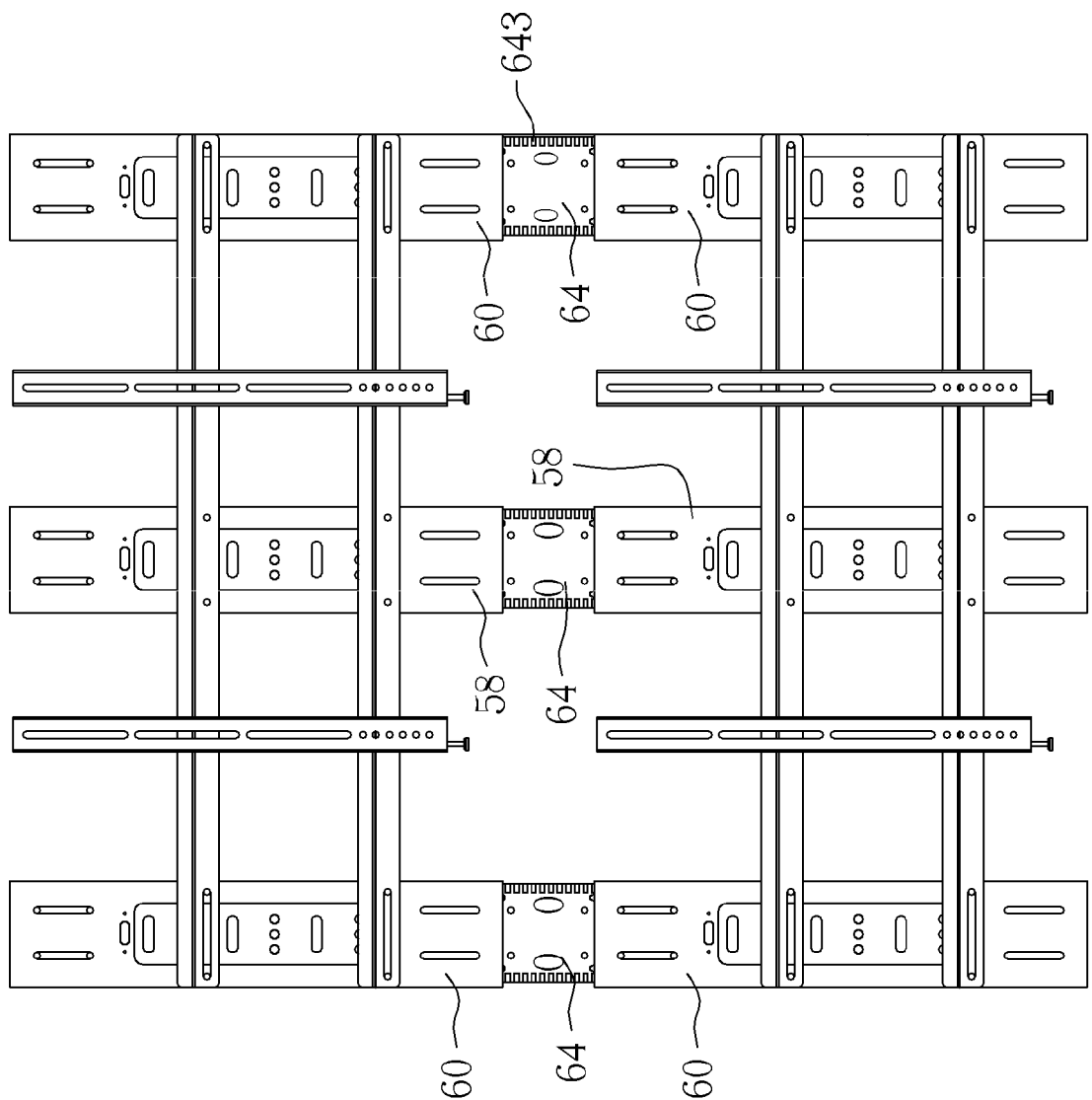
FIG. 7 is a diagram of the connecting components sheathed inside the adjacent first stands and the adjacent second stands vertically of the present invention.

Please refer to FIG. 3 and FIG. 7. FIG. 7 is a diagram of the connecting components 64 sheathed inside the adjacent first stands 58 and the adjacent second stands 60 vertically of the present invention. A plurality of graduations 643 is formed on the connecting component 64 for locating a relative position between the adjacent first stands 58 of the different mounting bracket modules 54 or between the adjacent second stands 60 of the different mounting bracket modules 54. That is to say, if a relative position between the adjacent mounting bracket module 54 needs to be adjusted, the adjacent first stands 58 or the adjacent seconds stands 60 can be locked on a corresponding position of the connecting component 64 so as to control an interval between the adjacent mounting bracket modules 54. A reference point of the plurality of graduations 643 (a zero point) can be graduated at a middle of the connecting component 64, and values of the graduations increase approaching to the two ends of the connecting component 64. For example, heights of the first stand 58 and the second stand 60 are both H1, and a height of the display 50 is H2. While H2 is larger than H1 and the adjacent first stands 58 and the adjacent second stands 60 are closed vertically, the adjacent displays 50 can not be combined on the adjacent mounting bracket modules 54 simultaneously. At this time, graduated positions of the connecting component 64 where the adjacent first stands 58 and the adjacent second stands 60 are located must be adjusted. It means that each end of the adjacent first stands 58 and the adjacent second stands 60 can be adjusted to the graduated positions of (H2−H1)/2 so as to increase the interval between the adjacent mounting bracket modules 54.

Therefore, the plurality of displays 50 being higher then the mounting bracket module 54 can be installed on the mounting bracket mechanism 52 simultaneously.

Figure 8:
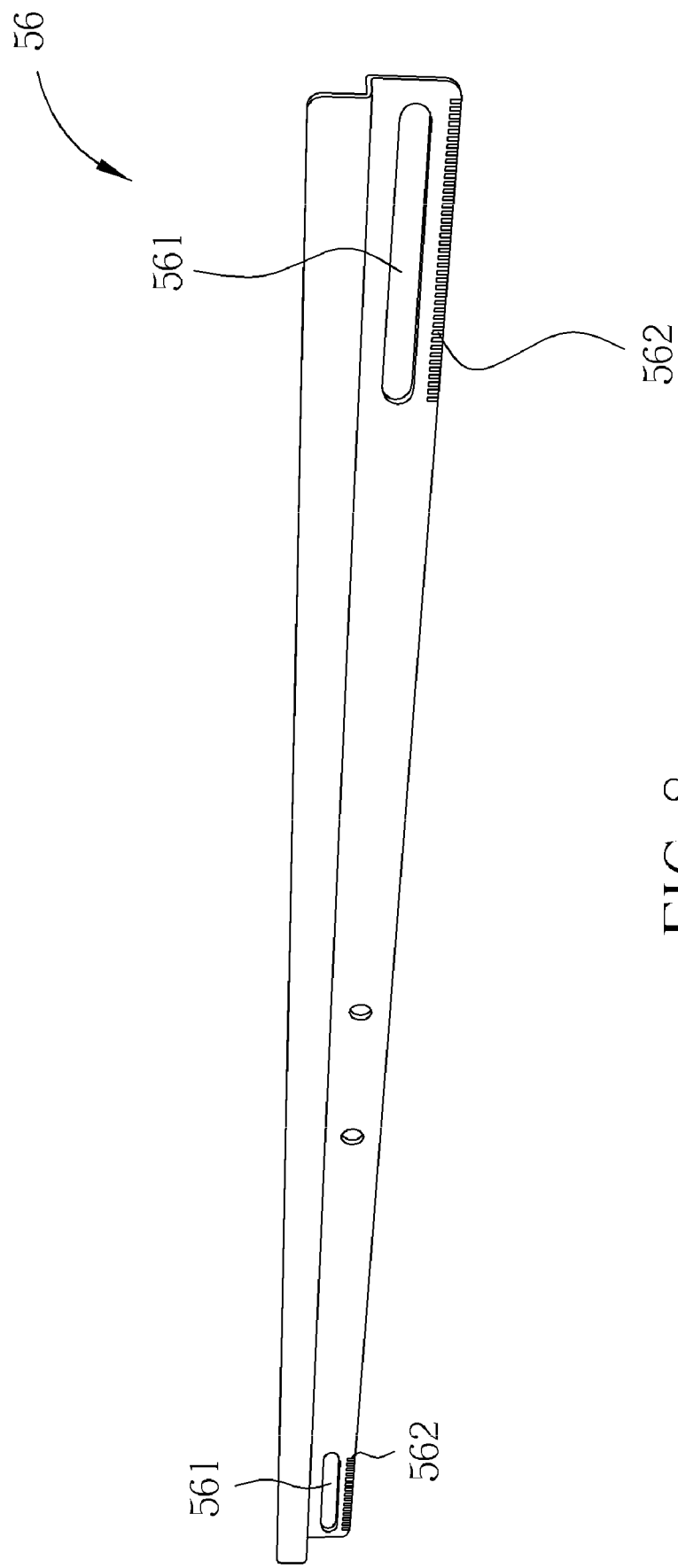
FIG. 8 is a diagram of a beam of the present invention.
Figure 9:
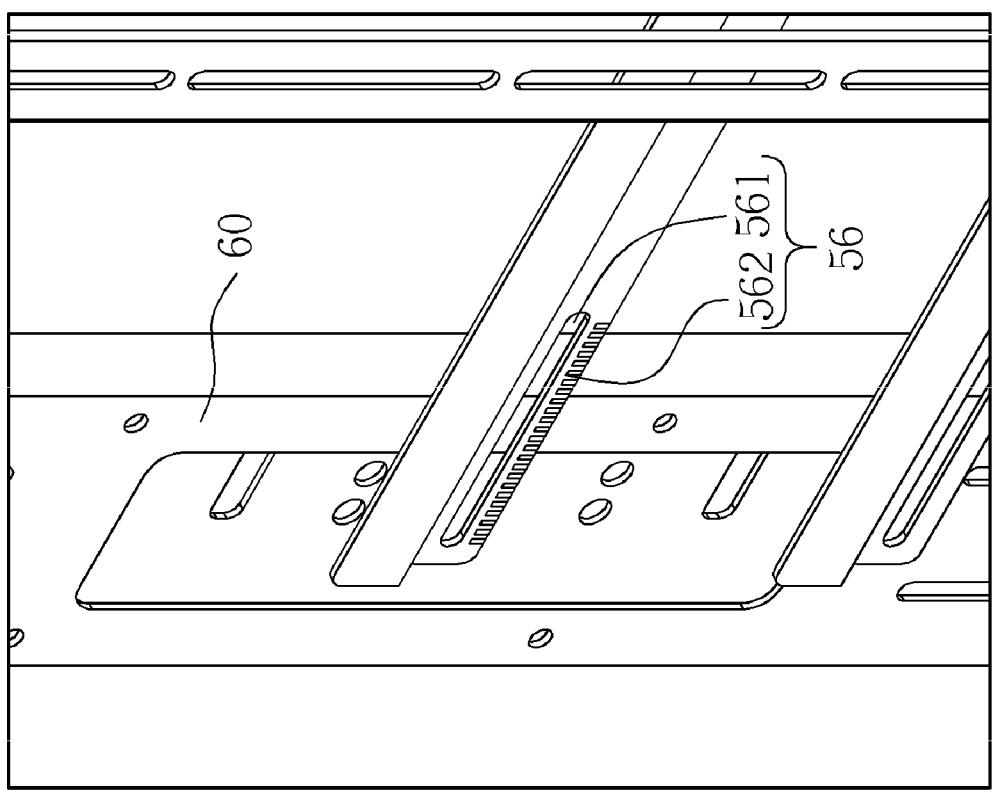
FIG. 9 is a diagram of the second stand locking on the beam of the present invention.

Please refer to FIG. 8 and FIG. 9. FIG. 8 is a diagram of the beam 56 of the present invention. FIG. 9 is a diagram of the second stand 60 locking on the beam 56 of the present invention. Slots 561 are formed on two ends of the beams 56 respectively, and a plurality of graduations 562 is formed on a side of the slots 561 of the beam 56. The plurality of graduations 562 is used for locating a relative position between the second stand 60 and the beam 56. The second stand 60 is locked on the slot 561 of the beam 56. The relative position between the second stand 60 and the beam 56 can be adjusted by adjusting a position of the second stand 60 locking on the slot 561 of the beam 56. That is to say, if width of the whole mounting bracket module 54 has to be adjusted, the second stand 60 can be locked on a corresponding position of the beam 56 so as to fit the display 50 of different sizes. A reference point of the plurality of graduations 562 (a zero point) can be graduated at an internal end of the slot 561. Values of the graduations increase approaching to an external end of the slot 561. For example, a width of the beam 56 is W1, and a width of the display 50 is W2. While W2 is larger than W1 of the adjacent mounting bracket modules 54 are closed laterally, the adjacent displays 50 can not be combined on the adjacent mounting bracket modules 54 simultaneously. At this time, graduated positions where the adjacent second stands 60 are locked on the beams 56 must be adjusted. It means that two sides of the adjacent second stands 60 can be locked on the graduated positions of (W2−W1)/2 so as to increase an interval between the two second stands 60 of the same mounting bracket module 54. It also means that a width of the whole mounting bracket module 54 can be enlarged. Therefore, the plurality of displays 50 being wider then the mounting bracket module 54 can be installed on the mounting bracket mechanism 52 simultaneously.

In contrast to the prior art, the present invention utilizes the mounting bracket module to assemble the video-wall structure without complicated measurements. The present invention only needs to combine the mounting bracket modules so as to complete the video-wall structure. The connecting component can be applied on vertical extension and on lateral extension simultaneously so as to simplify mechanical design. The plurality of graduations is formed on the connecting component so as to cooperate with the displays of different sizes. Furthermore, the present invention increases flexibility of the mounting bracket mechanism due to adjustable mechanism of the mounting bracket module. The present invention provides the mounting bracket mechanism having advantages of a simplified structure and flexibility indeed.

Those skilled in the art will readily observe that numerous modifications and alterations of the device and method may be made while retaining the teachings of the invention.

What is claimed is:

1. A mounting bracket mechanism comprising:
   a plurality of first stands;
   at least one beam locked on the first stand, a slot being formed on the at least one beam;
   two second stands respectively disposed on two sides of one of the plurality of first stands and locked on the slot on the at least one beam in an adjustable manner relative to the at least one beam, and the two second stands being parallel to each other substantially; and
   at least one hanger for connecting a monitor and hanging the monitor on the beam so as to fix the monitor.

2. The mounting bracket mechanism of claim 1, wherein the mounting bracket mechanism comprises two beams locked on the plurality of first stands and the two second stands perpendicularly and being parallel to each other substantially.

3. The mounting bracket mechanism of claim 1, wherein a plurality of graduations is formed on the at least one beam and is located on a side of the slot for locating a relative position between the two second stands and the at least one beam.

4. The mounting bracket mechanism of claim 1, wherein the mounting bracket mechanism comprises two hangers hung on the at least one beam perpendicularly and being parallel to each other substantially.

5. The mounting bracket mechanism of claim 1, further comprising a connecting component for connecting the adjacent second stands laterally by locking two ends of the connecting component on surfaces of the adjacent second stands respectively.

6. The mounting bracket mechanism of claim 5, wherein a plurality of graduations is formed on the connecting component for locating relative positions between the adjacent first stands or the adjacent second stands.

7. The mounting bracket mechanism of claim 1, further comprising a connecting component for connecting the adjacent first stands or the adjacent second stands vertically by sheathing two ends of the connecting component inside the adjacent first stands or the adjacent second stands respectively.

8. A mounting bracket mechanism comprising:
   a plurality of first stands;
   at least one beam locked on the plurality of first stands, a slot being formed on the at least one beam;
   a plurality of second stands disposed alternately with the plurality of first stands and locked on the slot on the at least one beam in an adjustable manner respectively;
   at least one connecting component for connecting the adjacent first stands or the adjacent second stands; and
   at least one hanger for connecting a monitor and hanging the monitor on the at least one beam so as to fix the monitor.

9. The mounting bracket mechanism of claim 8, wherein the mounting bracket mechanism comprises two beams locked on the plurality of first stands and the plurality of second stands perpendicularly and being parallel to each other substantially.

10. The mounting bracket mechanism of claim 8, wherein a plurality of graduations is formed on the at least one beam and is located on a side of the slot for locating relative positions between the plurality of second stands and the at least one beam.

11. The mounting bracket mechanism of claim 8, wherein the mounting bracket mechanism comprises two second stands disposed on two sides of one of the plurality of first stands respectively and being parallel to each other substantially.

12. The mounting bracket mechanism of claim 8, wherein the mounting bracket mechanism comprises two hangers locked on the at least one beam perpendicularly and being parallel to each other substantially.

13. The mounting bracket mechanism of claim 8, wherein the at least one connecting component is for connecting the adjacent second stands laterally by locking two ends of the at least one connecting component on surfaces of the adjacent second stands.

14. The mounting bracket mechanism of claim 8, wherein the at least one connecting component is for connecting the adjacent first stands or the adjacent second stands vertically by sheathing two ends of the at least one connecting component inside the adjacent first stands or the adjacent second stands respectively.

15. The mounting bracket mechanism of claim 8, wherein a plurality of graduations is formed on the at least one connecting component for locating relative positions between the adjacent first stands or the adjacent second stands.

* * * * *